United States Patent

[11] 3,617,632

[72] Inventors Valentin Fedorovich Zolotarev
K-482 Korpus 332, kv. 21;
Vitaly Ivanovich Stafeev, K-482 Korpus 321, kv. 65; Anatoly Pavlovich Budenny, ulitsa Scherbakovskaya, 16/18, kv. 218, all of, Moscow, U.S.S.R.

[21] Appl. No. 750,135
[22] Filed Aug. 5, 1968
[45] Patented Nov. 2, 1971

[54] TELEVISION IMAGE ANALYZER
10 Claims, 5 Drawing Figs.

[52] U.S. Cl. ........ 178/7.1, 250/211 J
[51] Int. Cl. ........ H04n 5/30
[50] Field of Search ........ 178/7.1, 7.2; 250/219 I, 219 CR, 211, 213, 211 J, 211 R; 313/108 A, 108 B; 315/169 TV, 169; 340/173, 347; 307/280, 283, 284, 287

[56] References Cited
UNITED STATES PATENTS

| | | | |
|---|---|---|---|
| 3,111,556 | 11/1963 | Knoll et al. | 178/7.1 |
| 3,202,824 | 8/1965 | Yando | 250/219 (IDC) |
| 3,400,273 | 9/1968 | Horton | 178/7.1 |
| 3,443,166 | 5/1969 | Ing, Jr. et al. | 250/211 J |
| 3,445,589 | 5/1969 | Taylor | 178/7.1 |
| 3,488,508 | 1/1970 | Weimer | 250/211 J |
| 3,424,910 | 1/1969 | Mayer et al. | 250/211 J |

*Primary Examiner*—Richard Murray
*Assistant Examiner*—Alfred H. Eddleman
*Attorney*—Waters, Roditi, Schwartz & Nissen ABSTRACT: A television image analyzer comprises a photoelectric surface whose local areas or elements are switched sequentially to obtain a desired scanning pattern and which is coated with a translucent electrode. The photoelectric surface is arranged on a nonlinear resistive structure which has a current-controlled negative slope volt-ampere characteristic while the nonlinear structure, along with the photoelectric surface, is connected to a DC source and also to a pulse source so that a DC voltage is supplied at right angle to the excitation direction of the photoelectric-surface elements and a pulse is injected along this direction to produce in a nonlinear resistive structure a spontaneously propagating hyperconductive area which consecutively excites the elements of the photoelectric surface.

TELEVISION IMAGE ANALYZER

The present invention relates to television image analyzers, and more specifically to solid-state analogs of camera tubes.

It is known to use prior art methods and devices for the analysis of solid-state images. These devices are semiconductor plates with an NP-junction at one end. A light image is formed onto the plate during short time intervals. As a result, nonequilibrium carriers appear in the illuminated areas of the semiconductor plate. When the light flux is interrupted, a current pulse is applied to the ends of the plate to cause the nonequilibrium carriers to move across the plate to the NP-junction where they are collected as the picture signal.

These devices however suffer from a number of disadvantages. For instance, the light flux from the scene being televised has to be interrupted. Additionally, their sensitivity is low because they do not utilize electric-image storage. Also, since the injected current pulse spreads as it moves along the plate, the picture signal is not related linearly to the brightness and size of the elementary sections of the optical image. As a result, such devices are unreliable or have to be made more complicated in design. The need for a current source to drive nonequilibrium carriers adds to the complexity of the devices.

An object of the invention is to eliminate the above-mentioned disadvantages.

Another object of the invention is to provide an economical, small and reliable television image analyzer.

The invention consists in that above objects are accomplished in a television image analyzer comprising a photoelectric surface whose local areas or elements are switched (excited) sequentially so as to obtain a desired scanning pattern and which is coated by a translucent electrode; the photoelectric surface being arranged, according to the invention, on a nonlinear resistive structure which has a current-controlled negative slope volt-ampere characteristic (the S-type curve with a negative dynamic resistance region) while the nonlinear resistive structure, along with the photoelectric surface, is connected to a DC source and also to a pulse source so that a DC voltage is applied at right angles to the excitation direction of the photoelectric-surface elements and a pulse is injected along this direction to produce in the nonlinear resistive structure a spontaneously propagating hyper-conductive area which consecutively excites the elements of the photoelectric surface.

In order to stabilize the propagation velocity of the hyper-conductive area, the elements of the nonlinear resistive structure are connected to a sync generator operating at a frequency which is a multiple of the rate at which the elements of the photoelectric surface are switched.

The nonlinear resistive structure may be a multilayer semiconductor coated with a backing electrode on the side opposite to the photoelectric surface.

The image analyzer may be divided into strips insulated from one another and arranged on a common substrate in such a manner that the strip ends are galvanically connected to produce a desired scanning pattern, the connection being through one of the middle layers of the semiconductor material so that a closed neuristor line is formed.

It is preferable to divide into strips only the multilayer semiconductor material. This can be done by means of ducts on the backing electrode side, running the whole length of the material in the direction of propagation of the hyper-conductive area and reaching the middle NP-junction in depth. These ducts are filled with a conducting solid insulated from the multilayer semiconductor and the backing electrode. In the direction normal to the propagation velocity vector of the hyper-conductive area the remaining layers are divided into sections by a semiconductor material of the opposite conduction type located over the centers of the ducts and insulated from the photoelectric surface. The ends of the strips formed in the direction of propagation of the hyper-conductive area are galvanically connected to give a desired scanning pattern, the connection being through one of the middle layers by the conducting solid, so that a closed neuristor line is formed.

The multilayer semiconductor may be divided into strips in a simpler way: the layers of the semiconductor are separated by regions of a material of the opposite conduction type, insulated from the photoelectric surface and the backing electrode. The ends of the strips are galvanically connected so as to obtain a desired scanning pattern, the connection being through one of the middle layers so that a closed neuristor line is formed.

The multilayer semiconductor may also be made up of sections alternating in the direction of propagation of the hyper-conductive area in such a manner that some sections have an S-type volt-ampere characteristic and are galvanically connected to the photoelectric surface, while in other sections insulated from the photoelectric surface the layers located above the middle NP-junction on the photoelectric-surface side have a conduction opposite to that of the layers in adjacent sections, and the layer adjoining the middle NP-junction on the backing electrode side has the same conduction as the similar layer in the adjacent section.

The invention will be more fully understood from the following description of preferred embodiments when read in connection with the appended drawings wherein.

Figure 4:
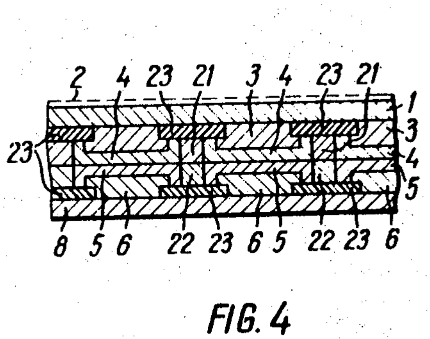
Figure 5:
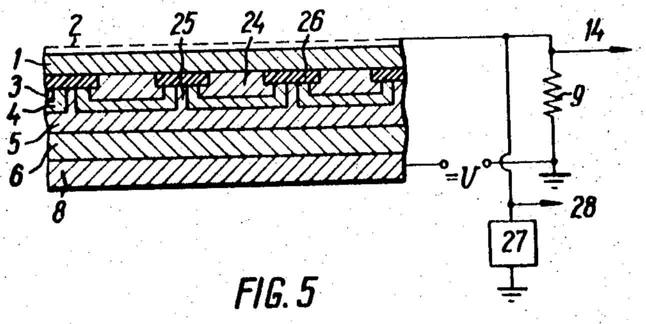
Figure 3:
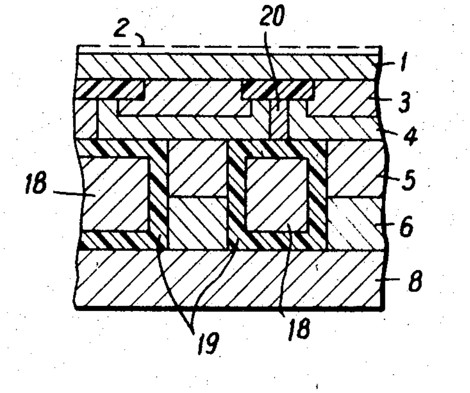

FIGS. 3 and 4 show sectional views across a horizontal scanning strip of two embodiments of a television image analyzer in which the multilayer semiconductor is divided into strips according to the invention; and FIG. 5 shows a sectional view along a horizontal scanning strip of a television image analyzer in which the multilayer semiconductor has sections with different volt-ampere characteristics and provides stabilization for the propagation velocity of the hyper-conductive area, according to the invention.

It is to be understood that the embodiments described and the specific materials quoted in the text are not the only ones possible and solely serve to illustrate the invention.

The image to be televised is projected onto a photoelectric surface 1 (FIG. 1), through a translucent electrode 2. The photoelectric surface may be of any type of semiconductor material whose resistance or capacitance is a function of illumination: the capacitance-forming layer of the translucent electrode and the sub surface layer of a semiconductor in which a space charge is distributed (provided the semiconductor layer is not opaque to light, such as SiO); a layer of a semiconductor possessing the photodielectric effect, and the like.

Figure 1:
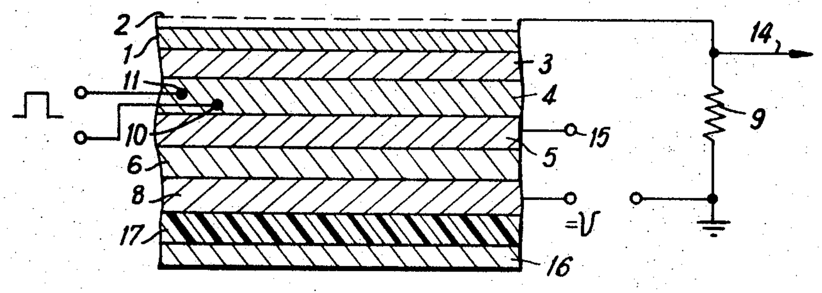
FIG. 1 shows a sectional view along a horizontal scanning strip of a television image analyzer according to the invention.
Figure 2:
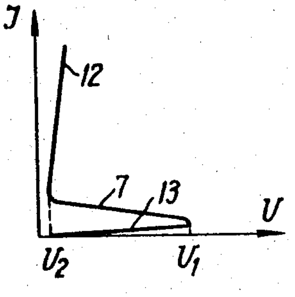
FIG. 2 shows the volt-ampere characteristic of a nonlinear resistive structure.

The photoelectric surface is applied to a nonlinear resistive structure consisting of semiconductor layers 3, 4, 5, 6, having an S-type volt-ampere characteristic with a negative dynamic resistance region 7 (FIG. 2). The nonlinear resistive structure shown in FIG. 1 is actually a solid-state switching device, like a thyristor. Use may however be made of a PNPNP-diode, a two-base diode, or any other device having a negative-resistance volt-ampere characteristic. Furthermore, it may consist of grid-coupled thyratrons having a common electrode. The nonlinear resistive structure may alternatively be a layer of a glass semiconductor which, along with the near-terminal areas, forms a negative-resistance multilayer semiconductor.

The DC supply voltage Y is applied between the electrodes 2 and 8 via a load 9. Attached to the layer 4, which is one of the middle layers of the resistive structure, are two gates 10 and 11.

The photoelectric surface 1 and the multilayer semiconductor 3–6 divide the voltage Y in such a proportion that the voltage across the semiconductor 3–6 is below the breakover voltage Y, (FIG. 2).

When an electric pulse is injected along the multilayer semiconductor through the gates 10 and 11 (FIG. 1), the voltage at the gate 10 (or 11, depending on the polarity of the applied pulse) in the semiconductor rises above $Y_1$, while the voltage at the other gate 11 (or 10, respectively) drops. As soon as the voltage at the gate 10 rises above $Y_1$ (the breakover value), the semiconductor element in that area goes into a hyper-conductive state. This state is represented by a portion 12 (FIG. 2) of the volt-ampere characteristic. This breakdown causes a redistribution of the supply voltage and charges the elementary capacitors on the photoelectric surface 1 (FIG. 1) adjacent to the hyper-conductive area of the semiconductor. As the elementary capacitors on the electric surface 1 charge, the supply voltage across the semiconductor layers 3-6 drops to $Y_2$, (FIG. 2) and the semiconductor is again blocked for flow of current. This state is represented by a portion 13 of the volt-ampere characteristic. Now, the voltage between the elements of the photoelectric surface 1 (FIG. 1) and the elements of the multilayer semiconductor 3-6 is redistributed in a reverse manner, and the operating point of the device traces out the portion 13 of the volt-ampere characteristic (FIG. 2).

When the hyper-conductive area arrives at the element near the gate 10 (FIG. 1), excess carriers diffuse from the element of the multilayer semiconductor into adjacent elements, and the hyper-conductive area shunts those adjacent elements. As a result, the breakover voltage across the element of the multilayer semiconductor 3–6 adjacent to the gate 10 (FIG. 1) is reduced from $Y_1$ (FIG. 2) to that of the supply voltage, and the element goes into a hyper-conductive state. Then, the events repeat again. The element at the gate 11 is prevented from going into a hyper-conductive state by the pulse applied to the gates 10 and 11.

After the cycle just described is completed, the elements at the gates cannot change to the opposite state instantaneously because the elementary capacitors of the photoelectric surface 1 discharge very slowly.

Recapitulating, when the multilayer semiconductor is excited by an external pulse injected along the semiconductor, a hyper-conductive area forms in, and spontaneously propagates along, the semiconductor. The propagation of the hyper-conductive area is accompanied by the charging of the elementary capacitors of the photoelectric surface. On the whole, a device like the one whose sectional view is presented in Fig. 1 is a neuristor line in which the photoelectric surface acts as an energy-storing element. At the same time, it is an element corresponding to one horizontal scanning line of a television image analyzer.

Behind a hyper-conductive area going round the neuristor line, the elementary capacitors on the photoelectric surface 1 discharge at a rate proportional to the light intensity existing thereon. Thus, when there is an optical image on the photoelectric surface 1, the elementary capacitors on the photoelectric surface lose their electric charge into the horizontal scanning line to a different degree and an electric image is produced in which the current density over any elementary section has a one-to-one correspondence with the brightness of the optical image for the corresponding elementary section. A second hyper-conductive area restores the charge of the elementary capacitors on the photoelectric surface 1. The restoring current is proportional to the value of the charge lost by the elementary capacitors of the photoelectric surface 1 since they were scanned by the first hyper-conductive area. This current flows through the load 9, and the picture-signal voltage appearing across the load is collected at a terminal 14. The magnitude of the charge lost by the elementary capacitors of the photoelectirc surface 1 and, consequently, the picture-signal current are proportional to the illumination of the photoelectric surface for the entire time interval between two successive hyper-conductive areas scanning an element. Thus the television image analyzer utilizes electric-image storage.

In cases where the photoelectric surface is a photocapacitance whose value varies almost instantaneously with changes in the light intensity, there is no storage of an electric image, and the analyzer is of an instantaneously acting type. The picture-signal current is then proportional to the instantaneous light intensity of the image at the hyper-conductive area.

The above description applies to one line (strip) of a television image analyzer.

For faster scanning, several lines (strips) must be galvanically connected into a neuristor line.

Galvanic connection between the strip ends through one of the middle layers of the multilayer semiconductor provides for the passage of a hyper-conductive area from strip to strip. On arrival of a hyper-conductive area at the end of a strip, the end of the next strip (not shown in the drawing) is shunted by the galvanic connection 15. As a result, the breakover voltage $Y_1$ (FIG. 2) at the end element of the multilayer semiconductor is brought down to the value of the supply voltage, and that element goes into a hyper-conductive state.

Connection of strips (lines) into a closed neuristor line makes unnecessary the repeated triggering of a television image analyzer. Once produced in the nonlinear resistive structure (multilayer semiconductor) by the injection of an electric pulse in the direction of propagation, the hyper-conductive area will keep moving as long as may be necessary, giving rise to a picture-signal voltage across the load, and will cease only after the supply source is disconnected.

The shape of the closed neuristor line is governed by the scanning pattern desired and may be formed accordingly. The ends of the strips can be interconnected by means of conducting strips 16 (FIG. 1) applied to and insulated from the opposite side of the backing electrode 8 by a dielectric layer 17.

The analyzer may be divided into lines (strips) by ducts 18 (FIG. 3) provided on the backing-electrode side of the multilayer semiconductor so that they extend either as far as the middle NP-junction or the whole thickness of the semiconductor, and are insulated from the semiconductor layers 3–6 and the backing electrode 8 by a dielectric material 19 and filled with either a conducting or an insulating material. The conducting material may be used to provide for galvanic connection of the strips (lines) into a closed neuristor line.

The remaining layers of the multilayer semiconductor in the direction normal to the propagation velocity vector of the hyper-conductive area are divided into sections by a semiconductor material 20 of the opposite conduction type, located above the centers of the ducts 18 and insulated from the photoelectric surface 1.

A television image detector may alternatively be divided into lines (strips) by semiconductor sections 21 and 22 (FIG. 4) having the opposite type of conduction, insulated from the backing electrode and the photoelectric surface 1 by sections 23.

In a continuous nonlinear resistive structure a hyper-conductive area propagates at a velocity of 106 cm./sec. and more. In television the requisite scanning velocity is somewhat lower. The desired propagation velocity of a hyper-conductive area can be obtained by removing ohmic coupling between some sections along the layers 3 and 4 of the nonlinear resistive structure, located above the N–P junction on the photoelectric-surface side. This can be accomplished by producing sections 24 and 25 (FIG. 5) along each line (strip) in the resistive structure by means of spark-machining, planar or electron-beam methods, alternating in such a manner that some sections (say, 24) have an S-type volt-ampere characteristic and are galvanically connected to the photoelectric surface and other sections 25 do not possess such a volt-ampere characteristic and are insulated from the photoelectric surface 1 by a dielectric material 26.

In order to obtain the desired propagation velocity of a hyper-conductive area, it is necessary to reduce the diffusion and ohmic coupling between the sections 24 of the resistive structure, which can be done by reducing the thickness of the semiconductor layers 5 and 6 and increasing the size of the sections 25.

The propagation velocity of a hyper-conductive area can be stabilized, that is made independent of the electrical image and variations in the properties of the resistive structure along the strips, by injecting sync pulses into the elements of the resistive structure at a frequency which is equal to or is a multiple of the rate at which the elements of the photoelectric surface are switched. Sync pulses are applied directly to the electrodes 2 and 8 of the television image analyzer from a sync generator 27. As a result, pulses appear across the load 9, of a polarity opposite to that of the picture signal. At the receiving end of the television circuit these pulses can be utilized as sync pulses and as black-level clamping signals. They can be removed from the picture signal either by connecting the unipolar output of the picture-signal amplifier (not shown) to the terminal 14 or by taking gating pulses from the output 28 of the sync generator 27.

If the presence of sync pulses in the picture signal is undesirable, they must be fed to that part of the electrode 2 which is parceled out by shadowing in the course of its deposition on to the photoelectric surface 1 and is not connected in the circuit of the load 9.

In order to synchronize the formation of the electrical image with the transmission of the picture frame the elementary sections of the photoelectric surface are switched by two consecutive hyper-conductive areas. These consecutive hyper-conductive areas are produced by applying two consecutive excitation pulses to the gates 10 and 11 (FIG. 1) spaced by a time interval equal to the formation time of the electrical image. The first pulse propagates when there is no electrical image formed yet and produces a constant voltage drop across the load 9, thereby causing the elementary capacitors of the photoelectric surface 1 to charge uniformly. The second pulse, travelling behind the first one at a time interval equal to the formation time of the electrical image, scans the latter and produces a picture signal across the load 9. The time during which the pulses scan the whole of the raster is equal to the transmission time of a picture frame and may be set independently of the formation time of the electrical image.

While the present invention has been described and illustrated in connection with preferred embodiments, it is not intended to be limited to the details shown, since various modifications and adaptations may be made without departing in any way from the idea and scope of the invention, which will be readily understood by those skilled in the field.

Such modifications and adaptations should and are intended to be comprehended within the meaning and range of equivalence of the present invention as set forth in the appended claims.

What is claimed as new and desired to be covered by Letters Patent is:

1. A television image analyzer comprising in combination: a nonlinear resistive structure having one side facing an image and an opposite side and an S-type volt-ampere characteristic; and a backing electrode applied to said one side of said nonlinear resistive structure; and a photoelectric surface including a plurality of directionally switched elementary sections applied to said opposite side of said nonlinear resistive structure; and a translucent electrode applied to said photoelectric surface on said one side facing the image; and a DC source connected between said backing and translucent electrodes so that a DC voltage is applied at right angles to the direction in which the elementary sections of said photoelectric surface are switched; and a pulse source connected to said nonlinear resistive structure so that the pulse is injected in the direction in which the elements of said photoelectric surface are switched and produces in said nonlinear resistive structure a spontaneously propagating hyper-conductive area which switches the elements of said photoelectric surface.

2. A television image analyzer, as claimed in claim 1, in which said nonlinear resistive structure is a multilayer semiconductor.

3. A television image analyzer as claimed in claim 1, wherein said switching elementary sections switch at a first rate, including a sync generator operating at a frequency which is a multiple of said first rate, said sync generator connected to said nonlinear resistive structure.

4. A television image analyzer, as claimed in claim 3, in which said nonlinear resistive structure is a multilayer semiconductor.

5. A television image analyzer, as claimed in claim 2, in which said translucent electrode, photoelectric surface, multilayer semiconductor and backing electrode are divided into mutually insulated strips arranged on a common substrate having ends galvanically interconnected according to the desired scanning pattern through one of a middle layers of said multilayer semiconductor forming a closed neuristor line.

6. A television image analyzer, as claimed in claim 5, in which said multilayer semiconductor in each strip consists of a NP-junction and of sections alternating in the direction of propagation of a hyper-conductive area in such a manner that some sections have a S-type volt-ampere characteristic and are galvanically connected to said photoelectric surface, while in other sections the layers located above said middle NP-junction on said photoelectric surface side have a conduction opposite to that of similar layers in adjacent sections, and the layer adjoining the middle NP-junction on the side of said backing electrode has the same conduction as the similar layer in the adjacent section.

7. A television image analyzer, as claimed in claim 2, in which said multilayer semiconductor includes a middle NP-junction and has ducts on the side of said backing electrode running the entire length of said semiconductor in the direction of propagation of the hyper-conductive area and reaching the middle NP-junction in depth, said ducts being filled with a conducting solid insulated from said multilayer semiconductor and backing electrode, while the remaining layers of said multilayer semiconductor are divided in the direction normal to the propagation velocity vector of the hyper-conductive area into sections by a semiconductor material of the opposite conduction type, located above said ducts and insulated from said photoelectric surface, and the ends of the strips of said multilayer semiconductor formed in the direction of propagation of the hyper-conductive area are galvanically interconnected according to the desired scanning pattern at one of the middle layers by said conducting solid, forming a closed neuristor line.

8. A television image analyzer, as claimed in claim 7, in which said multilayer semiconductor of each strip consists of sections alternating in the direction of propagation of the hyper-conductive area in such a manner that some sections have an S-type volt-ampere characteristic and are galvanically connected to said photoelectric surface, while in other sections insulated from said photoelectric surface the layers located above the middle NP-junction on said photoelectric surface side have a conduction opposite to that of similar layers in adjacent sections, and the layer adjoining the middle NP-junction on the side of the backing electrode has the same type of conduction as the similar layer in the adjacent section.

9. A television image analyzer, as claimed in claim 2, in which said multilayer semiconductor is divided in the direction of propagation of the hyper-conductive area into strips by a semiconductor material of the opposite conduction type, insulated from said photoelectric surface and signal electrode, and the ends of said strips are galvanically connected according to the desired scanning pattern through one of the middle layers, so that a closed neuristor line is formed.

10. A television image analyzer, as claimed in claim 9, in which said multilayer semiconductor of each strip consists of sections alternating in the direction of propagation of the hyper-conductive area in such a manner that some sections have an S-type volt-ampere characteristic and are galvanically connected to said photoelectric surface, while in other sections insulated from said photoelectric surface the layers located above the middle NP-junction on said photoelectric surface side have a conduction opposite to that of similar layers in adjacent sections, and the layer adjoining the middle NP-junction has the same conduction as the identical layer in the adjacent section.